United States Patent
Hao et al.

(10) Patent No.: US 10,498,811 B2
(45) Date of Patent: Dec. 3, 2019

(54) AUTOMATIC VALIDATION OF MOBILE APPLICATIONS ON SYNCHRONIZED MOBILE DEVICES

(71) Applicant: FMR LLC, Boston, MA (US)

(72) Inventors: Numen Hao, Dalian (CN); Tao Sui, Dalian (CN); Ji Zhan, Dalian (CN)

(73) Assignee: FMR LLC, Boston, MA (US)

( * ) Notice: Subject to any disclaimer, the term of this patent is extended or adjusted under 35 U.S.C. 154(b) by 488 days.

(21) Appl. No.: 15/294,484

(22) Filed: Oct. 14, 2016

(65) Prior Publication Data

US 2018/0084047 A1   Mar. 22, 2018

(30) Foreign Application Priority Data

Sep. 21, 2016  (CN) .......................... 2016 1 0843332

(51) Int. Cl.
*H04L 29/08* (2006.01)

(52) U.S. Cl.
CPC ................................ *H04L 67/1095* (2013.01)

(58) Field of Classification Search
CPC ....................................................... H04L 67/14
See application file for complete search history.

(56) References Cited

U.S. PATENT DOCUMENTS

| 8,381,094 B1 | 2/2013 | Prasad et al. |
| 8,620,305 B2 | 12/2013 | Singh et al. |
| 8,805,094 B2 | 8/2014 | Prasad et al. |
| 8,856,748 B1 | 10/2014 | Larsen et al. |
| 9,135,151 B2 | 9/2015 | Betak et al. |
| 9,195,574 B1 * | 11/2015 | Ryan .................... G06F 11/3664 |

(Continued)

OTHER PUBLICATIONS

Choudhary, Shauvik R., et al., "CROSSCHECK: Combining Crawling and Differencing to Better Detect Cross-browser Incompatibilities in Web Applications," ICST '12 Proceedings of the 2012 IEEE Sixth International Conference on Software Testing, Verification, and Validation, pp. 171-180, ISBN: 978-0-7695-4670-4, available at http://www.cc.gatech.edu/~shauvik/pubs/roychoudhary12icst.pdf.

(Continued)

*Primary Examiner* — Ario Etienne
*Assistant Examiner* — Sm Z Islam
(74) *Attorney, Agent, or Firm* — Proskauer Rose LLP

(57) ABSTRACT

Methods and apparatuses are described for automatic validation of applications on synchronized mobile devices. A server receives a command associated with a mobile application and a first image file corresponding to a current view of the application from a client computing device. The server transmits the command to a plurality of mobile devices coupled to the server. Each mobile device accesses the application and performs the command against the application. The server receives a second image file from each mobile device that corresponds to a current view of the mobile application on the mobile device. The server extracts a first set of text segments from predefined areas of the first image file and second sets of text segments from predefined areas of each second image file. The server compares the first set and each second set to determine whether a difference exists between the first set and each second set.

17 Claims, 5 Drawing Sheets

(56) References Cited

U.S. PATENT DOCUMENTS

2015/0324640 A1* 11/2015 Macciola ............... G06Q 10/10
382/112
2016/0034383 A1 2/2016 Duan et al.

OTHER PUBLICATIONS

"Object-based Mobile App Testing—What Do You Do When You Need Visual Based Reports and Verifications?," available from http://mobilelabsinc.com/object-based-mobile-app-testing-what-do-you-do-when-you-need-visual-based-reports-and-verifications/, dated Oct. 24, 2013, 13 pages.
Mesbah, Ali & Mukul R. Prasad, "Automated Cross-Browser Compatibility Testing," ICSE '11, May 21-28, 2011, Naikiki, Honolulu, HI, 2011, ISBN: 978-1-4503-0445-0/11/05, 10 pages.
Bowers, Alan & James Bell, "Automated testing with Selenium and Cucumber," IBM developerWorks, dated Aug. 6, 2013, available at http://www.ibm.com/developerworks/library/a-automating-ria/, 9 pages.
Semenenko, N. et al., "Browserbite: Accurate Cross-Browser Testing via Machine Learning Over Image Features," 29th IEEE International Conference on Software Maintenance (ICSM), 2013, ISBN 978-0-7695-4981-1, 4 pages.

* cited by examiner

AUTOMATIC VALIDATION OF MOBILE APPLICATIONS ON SYNCHRONIZED MOBILE DEVICES

CROSS REFERENCE TO RELATED APPLICATION

This application claims priority to corresponding Chinese Patent Application No. 201610843332.5 filed on Sep. 21, 2016, the entirety of which is incorporated herein by reference.

TECHNICAL FIELD

This application relates generally to methods and apparatuses, including computer program products, for automatic validation of applications on synchronized mobile devices.

BACKGROUND

Today's computing devices, such as laptops, tablets and smartphones, are available in a wide variety of hardware and software platforms each having different operational requirements and form factors. Most of these devices provide software to enable users to connect to the internet and access mobile applications. Today's web applications typically require the same test cases to be performed on applications across multiple platforms and layouts, where each application often has slight variations in terms of appearance and function when executed on each device due to elements like screen size, user interface design, hardware profile, and so forth. As a result, the ability for application developers to quickly and efficiently test such mobile applications across the spectrum of devices, platforms, and layouts—without much (if any) manual tester involvement—has become important.

To efficiently test a wide variety of devices, synchronization of the mobile devices that execute the mobile applications is desirable. For example, a web site address that relates to a mobile application must be entered into each mobile device's browser to open the corresponding application. Also, certain features such as menus, pages, links, text information, buttons, diagrams, video, and images must be in the applications must be individually tested. Instead of requiring a tester to manually perform each test action on each separate device, a testing environment that is capable of automatically synchronizing the functions and actions of each mobile device regardless of the inherent differences in layout, form function, and functionality of each device, while also capturing the test results, can result in greater efficiency and scope of testing. However, such synchronization is difficult to achieve.

SUMMARY

Therefore, methods and systems are needed for automatic validation of mobile applications on a variety of different mobile devices that advantageously employs synchronization of the devices to rapidly and efficiently test the applications on each device. The techniques described herein describe a testing methodology that enables synchronized testing and validation of mobile applications on mobile devices that have varying layouts, form factors, screen sizes, and hardware platforms. Also, the techniques described herein leverage optical character recognition (OCR) technology to analyze areas of the application as displayed on the screens of each mobile device for comparison in order to validate whether the application is displayed properly. The synchronization component described herein makes the mobile software testing cycle more efficient, particularly where manual testing is currently being done on multiple different mobile devices under a time-to-market challenge. The systems and methods described herein can be applied to test any third-party mobile applications installed on mobile devices—as well as native mobile UI-based functionalities like phone dialing, SMS, calendar and the like, which current testing frameworks do not achieve.

The techniques provided herein combine mobile, remote-controlling technology in order to obtain screen images with associated contents, and process the images using OCR technology to validate the operation of the applications and determine whether any errors or problems exist on specific form factors, operating systems, and so forth. The synchronized processing described herein is based upon a parent-child framework, where multiple child devices operate simultaneously and in synchronization based upon receipt of instructions and information from a parent device.

The invention, in one aspect, features a computerized method for automatic validation of applications on synchronized mobile devices. A server computing device receives a command associated with a mobile application accessed by a client computing device and a first image file corresponding to a current view of the mobile application on the client computing device. The server computing device transmits the command to a plurality of mobile computing devices coupled to the server computing device. Each mobile computing device accesses the mobile application and performs the command against the mobile application upon receiving the command from the server computing device. The server computing device receives a second image file from each mobile computing device that corresponds to a current view of the mobile application on the mobile computing device. The server computing device extracts a first set of text segments from one or more predefined areas of the first image file and second sets of text segments from one or more predefined areas of each second image file. The server computing device compares the first set of text segments and each second set of text segments to determine whether a difference exists between the first set of text segments and each second set of text segments.

The invention, in another aspect, features a system for automatic validation of applications on synchronized mobile devices. The system comprises a server computing device with a processor and a memory. The server computing device is configured to receive a command associated with a mobile application accessed by a client computing device and a first image file corresponding to a current view of the mobile application on the client computing device. The server computing device is configured to transmit the command to a plurality of mobile computing devices coupled to the server computing device. Each mobile computing device accesses the mobile application and performs the command against the mobile application upon receiving the command from the server computing device. The server computing device is configured to receive a second image file from each mobile computing device that corresponds to a current view of the mobile application on the mobile computing device. The server computing device is configured to extract a first set of text segments from one or more predefined areas of the first image file and second sets of text segments from one or more predefined areas of each second image file. The server computing device is configured to compare the first set of text segments and each second set of text segments to determine whether a difference exists between the first set of text segments and each second set of text segments.

The invention, in another aspect, features a computer program product, tangibly embodied in a non-transitory computer readable storage device, for automatic validation of applications on synchronized mobile devices. The computer program product includes instructions operable to cause a server computing device to receive a command associated with a mobile application accessed by a client computing device and a first image file corresponding to a current view of the mobile application on the client computing device. The computer program product includes instructions operable to cause the server computing device to transmit the command to a plurality of mobile computing devices coupled to the server computing device. Each mobile computing device accesses the mobile application and performs the command against the mobile application upon receiving the command from the server computing device. The computer program product includes instructions operable to cause the server computing device to receive a second image file from each mobile computing device that corresponds to a current view of the mobile application on the mobile computing device. The computer program product includes instructions operable to cause the server computing device to extract a first set of text segments from one or more predefined areas of the first image file and second sets of text segments from one or more predefined areas of each second image file. The computer program product includes instructions operable to cause the server computing device to compare the first set of text segments and each second set of text segments to determine whether a difference exists between the first set of text segments and each second set of text segments.

Any of the above aspects can include one or more of the following features. In some embodiments, the predefined areas of the first image file are based upon a type of browser software that the client computing device uses to access the mobile application. In some embodiments, the predefined areas of each second image file are based upon a hardware platform of the corresponding mobile computing device that provided the second image file. In some embodiments, the predefined areas of each second image file are based upon a type of browser software of the corresponding mobile computing device that provided the second image file. In some embodiments, the predefined areas of each second image file are stored as coordinates in a configuration file at the server computing device.

In some embodiments, the server computing device extracts the first set of text segments and the second sets of text segments by performing optical character recognition against the first image file and the second image files. In some embodiments, the mobile application is provided by an application web server and each of the client computing device and the mobile computing devices connects separately to the application web server. In some embodiments, the command comprises an interaction with a user interface element. In some embodiments, the command comprises an input of an address to access the mobile application. In some embodiments, each mobile computing device performs the command against the mobile application substantially simultaneously upon receiving the command from the server computing device. In some embodiments, the difference comprises one or more text characters in the first set of text segments missing from the second set of text segments.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
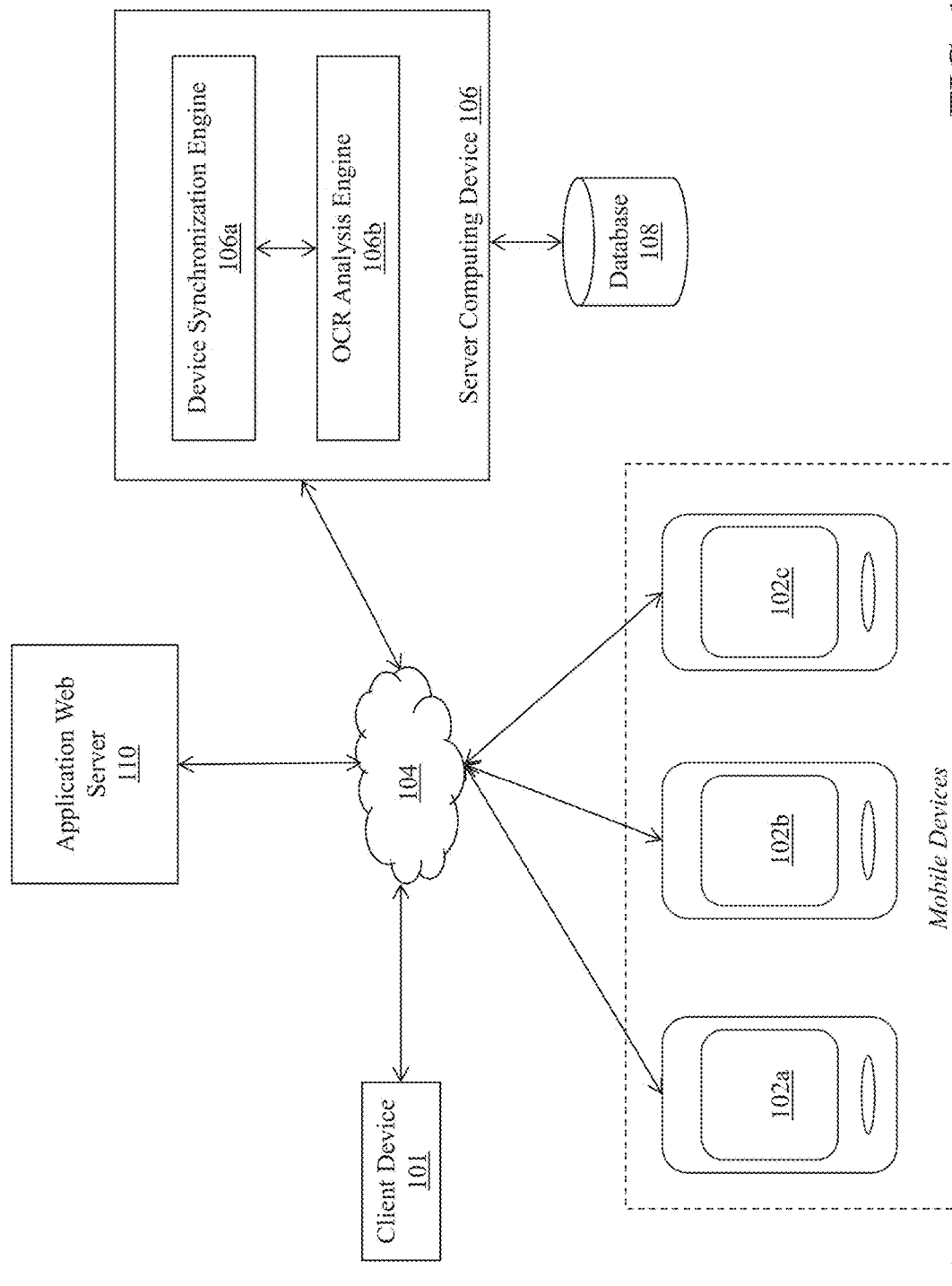
FIG. 1 is a block diagram of a system for automatic validation of applications on synchronized mobile devices.

FIG. 1 is a block diagram of a system 100 for automatic validation of applications on synchronized mobile devices. The system 100 includes a client computing device 101, a plurality of mobile computing devices 102a-102c, a communications network 104, a server computing device 106 with a device synchronization engine 106a and an OCR analysis engine 106b, a database 108, and an application web server 110.

The client computing device 101 uses software and circuitry (e.g., processor, memory) to execute applications and to communicate with the server computing device 106 and the web application server 110 via the communication network 104 (e.g., using browser software installed on the device to connect to the Internet via an embedded Wi-Fi antenna) for the purposes of testing mobile applications in synchronization with mobile devices 102a-102c as described herein. Example client computing devices 101 can include, but are not limited to, a desktop computer, laptop computer, tablet, mobile device or other similar types of computing devices.

The mobile computing devices 102a-102c use software and circuitry (e.g., processor, memory) to execute applications and to communicate with the server computing device 106 and the web application server 110 via the communication network 104 (e.g., using browser software installed on the device to connect to the Internet via an embedded Wi-Fi antenna) for the purposes of testing mobile applications in synchronization with the client computing device 101 as described herein. Example mobile computing devices 102a-102c can include, but are not limited to, a smart phone (e.g., Apple iPhone®, Windows®, and/or Android™-based device) or other similar mobile communications devices.

The communication network 104 enables components of the system 100 to communicate with each other using a packet-based protocol (e.g., IP). The network 104 may be a local network, such as a LAN, or a wide area network, such as the Internet. In some embodiments, the network 104 is comprised of several discrete networks and/or sub-networks (including related routing, load balancing, and traffic metering hardware).

The server computing device 106 is a combination of hardware and software modules that includes specialized hardware and/or software modules that execute on a processor and interact with memory modules of the server computing device 106, to receive data from the database 110, to transmit data to the database 110, and to communicate with the other devices of the system 100 (e.g., client device 101, mobile devices 102a-102c) in order to perform functions for automatic validation of applications on synchronized mobile devices as described herein. The server computing device 106 includes a device synchronization module 106a and an OCR analysis engine 106b (as mentioned above) that execute on and/or interact with the processor of the server computing device 106.

In some embodiments, the device synchronization module 106a and the OCR analysis engine 106b are specialized sets of computer software instructions programmed onto one or more dedicated processors in the server computing device 106 and can include specifically-designated memory locations and/or registers for executing the specialized computer software instructions. Although the device synchronization module 106a and the OCR analysis engine 106b are shown in FIG. 1 as executing within the same server computing device 106, in some embodiments the functionality of the device synchronization module 106a and the OCR analysis engine 106b can be distributed among a plurality of server computing devices. As shown in FIG. 1, the server computing device 106 enables the device synchronization module 106a and the OCR analysis engine 106b to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the device synchronization module 106a and the OCR analysis engine 106b is described in detail below.

The device synchronization engine 106a communicates with the client computing device 101 and the mobile devices 102a-102c in order to synchronize actions relating to application execution and testing among the devices 101, 102a-102c. As will be described in greater detail below, the device synchronization engine 106a receives actions (e.g., input of a URL, interaction with user interface elements, and the like) performed on the client computing device 101 for a browser-based application (e.g., as provided by application web server 110) and transmits those actions to the plurality of mobile devices 102a-102c for automatic execution of the same actions by the respective devices 102a-102c against the mobile application on each of the devices 102a-102c.

The OCR analysis engine 106b communicates with the client computing device 101 and the mobile devices 102a-102c to capture screenshots of the mobile application from each device 101, 102a-102c and perform optical character recognition on the screenshots, in order to compare the extracted text and validate the functionality of the mobile application on multiple mobile devices, as will be described in greater detail below.

The database 108 is a computing device (or in some embodiments, a set of computing devices) coupled to the server computing device 106 and is configured to receive, generate, and store specific segments of data relating to the process of automatic validation of applications on synchronized mobile devices as described herein. In some embodiments, all or a portion of the database 108 can be integrated with the server computing device 106 or be located on a separate computing device or devices. The database 108 can comprise one or more databases configured to store portions of data used by the other components of the system 108, as will be described in greater detail below. An exemplary database 108 is MySQL™ available from Oracle Corp. of Redwood City, Calif.

The application web server 110 is a computing device that provides a web-based software application accessible by browser software installed at the client computing device 101 and the plurality of mobile devices 102a-102c. For example, the application web server 110 can connect to each of the devices 101, 102a-102c via an HTTP session to handle requests for application functionality and to provide application data and functionality in response to the requests.

Figure 2:
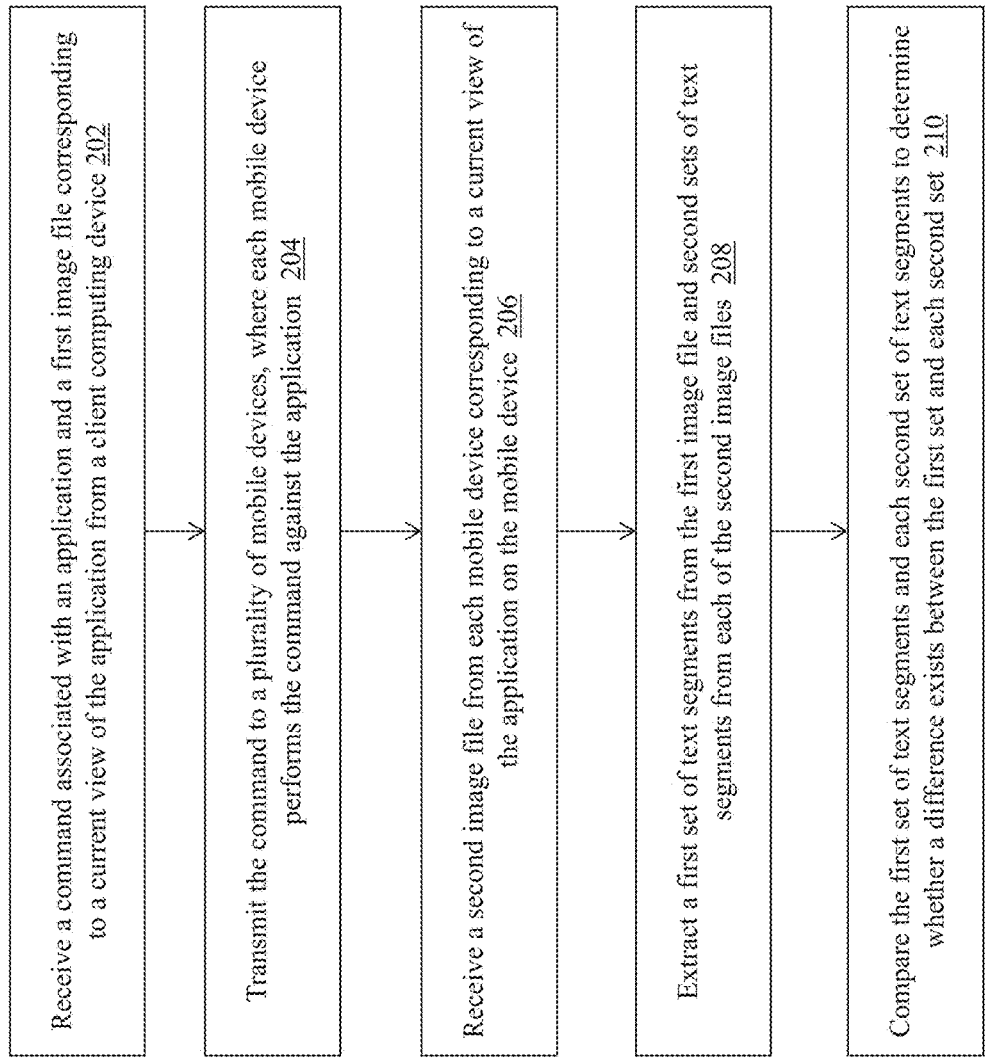
FIG. 2 is a flow diagram of a method for automatic validation of applications on synchronized mobile devices.

FIG. 2 is a flow diagram of a method 200 for automatic validation of applications on synchronized mobile devices, using the system 100 of FIG. 1. The device synchronization engine 106a of server computing device 106 establishes a connection (e.g., via the communications network 104) with each of the client computing device 101 and the mobile computing devices 102a-102c. The client computing device 101 performs a command in a mobile application that is being accessed by the client computing device 101. For example, the client computing device 101 can be configured to automatically execute browser software (or in some embodiments, execute application software utilizing elements of a browser that are embedded in the application) to access an application provided by application web server 110 (e.g., enter a URL into the browser or app that contains the address of the application web server 110 or of a particular application provided by the server 110) or interact with a user interface element of the application. The client device 101 can be capable of executing a test script to automatically perform commands against the mobile application without requiring a user to manually execute each step of the test script. It should be appreciated that the above commands are merely examples and that other types of functionality execution or interaction between the client computing device 101 and the application provided by the application web server 110 can be considered commands for the purposes of the systems and methods described herein.

Concurrently, the client computing device 101 captures an image of the current view of the application (i.e., a screenshot) upon completion of the command and stores the captured image locally as an image file (e.g., .JPG, .GIF). The client computing device 101 transmits the command performed at the client computing device 101 (e.g., the entry of a URL, the interaction with a user interface element) and the captured image file to the device synchronization engine 106.

The device synchronization engine 106a receives (202) the command and the image file from the client computing device 101 and transmits (204) the command to the plurality of mobile computing devices 102a-102c that are connected to the device synchronization engine 106a. The mobile computing devices 102a-102c can be devices of various type (i.e., have different hardware platforms, operating systems, form factors, and so forth) that are connected to the device synchronization engine 106a for the purposes of testing the mobile application on each of the different devices 102a-102c. For example, one mobile device 102a might be an Apple® iPhone™ 5, another mobile device 102b might be an Apple® iPhone™ 6s, and a third mobile device 102c might be a Samsung Galaxy Note5™. It should be appreciated that the system 100 can be configured with any number of mobile devices of varying hardware, software, and form factor.

Figure 3:
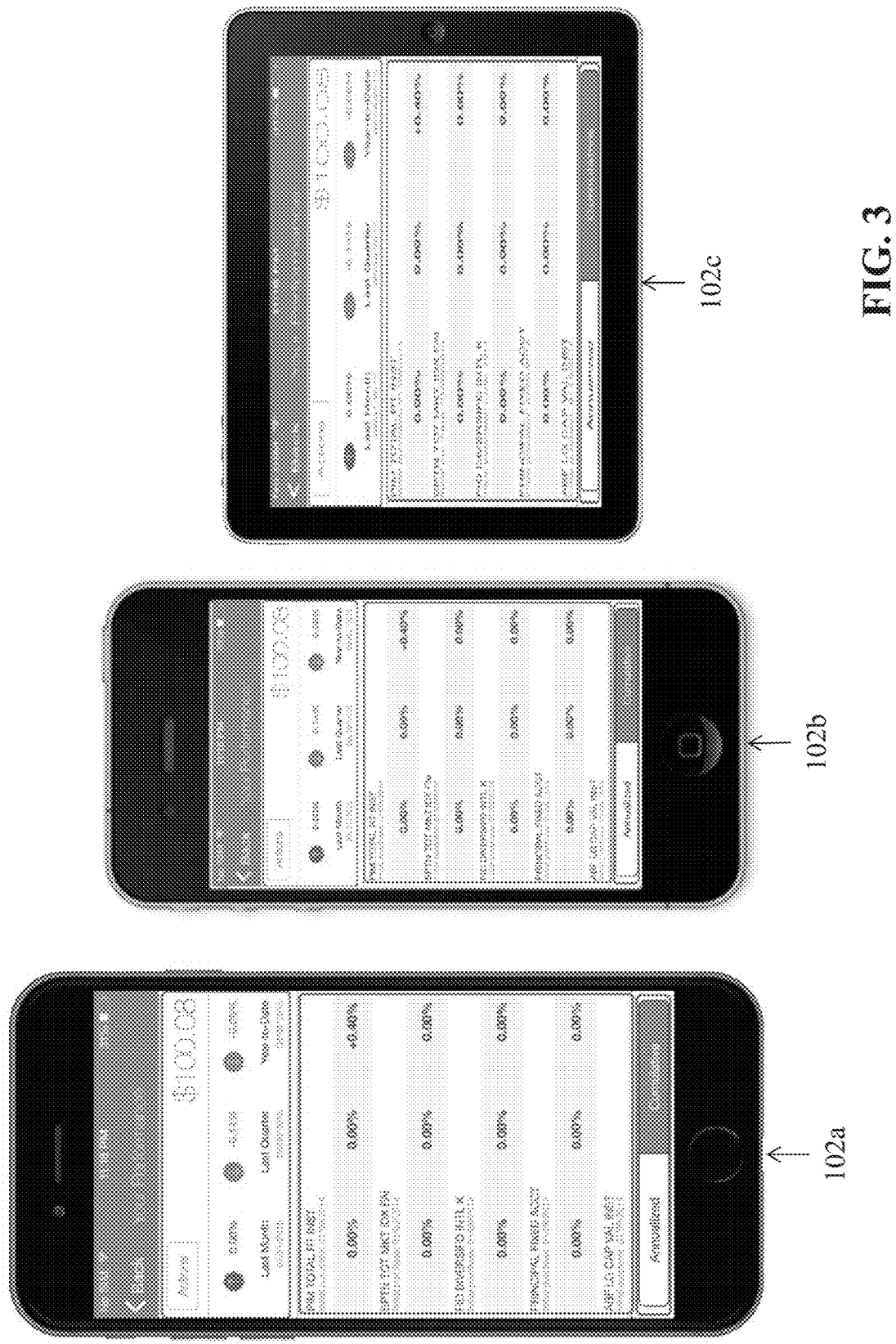
FIG. 3 is a diagram of a plurality of mobile devices displaying the same mobile application in the same state with the same user interface elements.

Upon receiving the command from the device synchronization engine 106a, each mobile device 102a-102c accesses the same mobile application that is accessed by the client computing device 101. Each mobile device 102a-102c can launch browser software installed on the device 102a-102c and communicate with the application web server 110 to perform the command and access the application in the same state/user interface view as present on the client computing device 101, thereby achieving synchronization between the client computing device 101 and the mobile devices 102a-102c. As shown in FIG. 3, each of the mobile devices 102a-102c displays the same mobile application in the same state (i.e., at an account performance screen) that displays the same user interface elements (e.g., data fields, buttons, and the like). It should be appreciated that each of the devices 102a-102c automatically performs the command without requiring any manual input or manual manipulation by a user.

Figure 4:
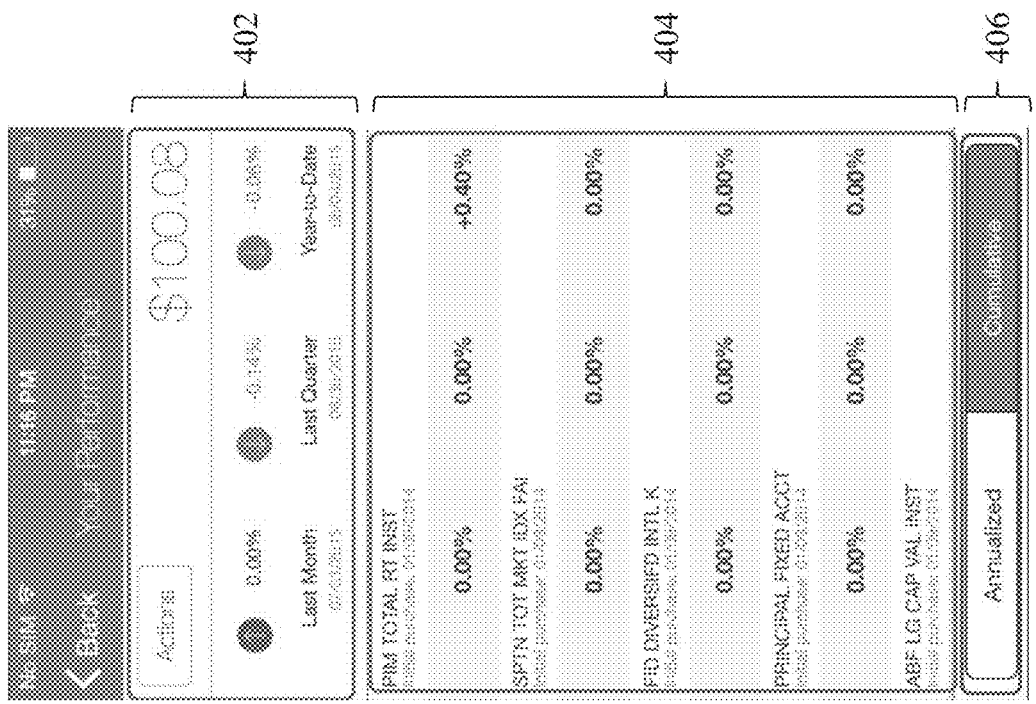
FIG. 4 is a diagram of an exemplary image capture of a current view of the application from a mobile device.

Each mobile device 102a-102c also captures an image of the current view of the application (i.e., a screenshot) upon completion of the command and stores the captured image locally as an image file (e.g., .JPG, .GIF). Each mobile device 102a-102c transmits the captured image file to the device synchronization engine 106. An example image 400 of the current view of the application from a mobile device (e.g., 102a) is shown in FIG. 4. The image 400 includes three areas or regions of the current view of the application: Area A 402, Area B 404, and Area C 406. It should be appreciated that an area can be defined in any number of ways, including but not limited to an area of the user interface, a specific user interface element such as a drop-down box, a button, a text input field, and so forth.

The device synchronization engine 106a receives (206) the image files from each of the mobile devices 102a-102c, and transmits both the image file from the client computing device 101 and the image files from each of the mobile devices 102a-102c to the OCR analysis engine 106b.

The OCR analysis engine 106b extracts (208) a set of text segments from each area (e.g., Area A, Area B, and Area C) of the application view from each of the image files. The OCR analysis engine 106b determines the device type (e.g., iPhone™ 5, iPhone™ 6, Samsung Galaxy Note5™) and refers to a configuration file stored in database 108 to determine elements like browser size for the device type and coordinates for each of the areas on which to perform optical character recognition. For example, the configuration file contains, e.g., a device type, an area ID (which identifies each different area for a particular device type), a screen size/browser size for each device type, and coordinates defining each of the areas per device type. The configuration file also contains a section for storing the text segments extracted by the OCR analysis engine 106b from each of the areas. An exemplary configuration file format is set forth below in Table 1.

| Device Type | Area ID | Text Contents | Coordinates | Browser Size |
|---|---|---|---|---|
| iPhone 5 | iphone5a | | [x1, y1] | 320 × 568 pixels |
| | | | [x2, y2] | |
| | | | [x3, y3] | |
| | | | [x4, y4] | |

-continued

| Device Type | Area ID | Text Contents | Coordinates | Browser Size |
|---|---|---|---|---|
| iPhone 5 | iphone5b | | [x5, y5] | 320 × 568 pixels |
| | | | [x6, y6] | |
| | | | [x7, y7] | |
| | | | [x8, y8] | |
| iPhone 5 | iphone5c | | [x9, y9] | 320 × 568 pixels |
| | | | [x10, y10] | |
| | | | [x11, y11] | |
| | | | [x12, y12] | |
| iPhone 6 | iphone6a | | [x'1, y'1] | 375 × 667 pixels |
| | | | [x'2, y'2] | |
| | | | [x'3, y'3] | |
| | | | [x'4, y'4] | |
| iPhone 6 | iphone6b | | [x'5, y'5] | 375 × 667 pixels |
| | | | [x'6, y'6] | |
| | | | [x'7, y'7] | |
| | | | [x'8, y'8] | |
| iPhone 6 | iphone6c | | [x'9, y'9] | 375 × 667 pixels |
| | | | [x'10, y'10] | |
| | | | [x'11, y'11] | |
| | | | [x'12, y'12] | |
| Galaxy Note5 | galaxynote5a | | [x"1, y"1] | 360 × 640 pixels |
| | | | [x"2, y"2] | |
| | | | [x"3, y"3] | |
| | | | [x"4, y"4] | |
| Galaxy Note5 | galaxynote5b | | [x"5, y"5] | 360 × 640 pixels |
| | | | [x"6, y"6] | |
| | | | [x"7, y"7] | |
| | | | [x"8, y"8] | |
| Galaxy Note5 | galaxynote5c | | [x"9, y"9] | 360 × 640 pixels |
| | | | [x"10, y"10] | |
| | | | [x"11, y"11] | |
| | | | [x"12, y"12] | |

In some embodiments, the x, y coordinates in the configuration file are absolute coordinates for each device type.

Figure 5:
FIG. 5 is a diagram of an exemplary image capture of an application view showing the coordinate values used to scan the image file and extract the text.

The OCR analysis engine 106b scans the image files received from the mobile devices 102a-102c based upon the coordinates for each area as defined in the configuration file to extract text segments, and stores the extracted text segments in the configuration file. FIG. 5 is a diagram of an exemplary area 500 (e.g., Area A for iPhone 5) showing the coordinate values used by the OCR analysis engine 106b to scan the image file and extract the text. As shown in FIG. 5, each set of coordinates corresponds to a corner point (or pixel) of the area 500, and z corresponds to the height of the area—used to determine the values of the y-coordinates for the bottom two corners. It should be appreciated that the value for z can be predetermined based upon the device type and the configuration of the application, or in some embodiments, the OCR analysis engine 106b can determine the value for z during scanning of the image file (e.g., by determining landmarks in the image file such as specific user interface elements, borders, boxes, and the like).

Using the area 500 in FIG. 5 as an example, the OCR analysis engine 106b extracts text segments from the image file and arranges them in a predetermined format (e.g., csv), as follows:
Actions,$100.08    0.00%,−0.14%,−0.06%    LastMonth, LastQuarter,Year-to-Date    07/31/2015,06/30/2015,08/04/2015

The OCR analysis engine 106b stores the extracted text segments in the configuration file according to the device type and area ID from which the engine 106b extracted the segments.

Next, the OCR analysis engine 106b compares (210) the text segments extracted from the client computing device 101 (which in some embodiments acts as the baseline, meaning it contains all of the text segments that are expected to appear on the mobile devices 102a-102c) and each set of text segments extracted from the mobile devices 102a-102c to determine whether a difference exists between the text segments—which can indicate a layout, formatting, or other user interface-related error for the application as represented on the mobile devices 102a-102c.

For example, if the text segments extracted from the image file obtained from client computing device 101 contain the following:

Actions,$100.08 0.00%,−0.14%,−0.06% LastMonth, LastQuarter,Year-to-Date 07/31/2015,06/30/2015,08/04/2015 and the text segments extracted from one of the image files obtained from a mobile device (e.g., device 102a) contain the following:

Actions,$100. 0.00%,−0.14%,−0.0 LastMonth,LastQuarter,Year-to-Date 07/31/2015,06/30/2015,08/04/20

The OCR analysis engine 106b determines that several characters from certain text segments extracted from the client computing device image file are missing from the corresponding text segments extracted from the mobile device image file—which indicates that the view of the mobile application on the mobile device is configured incorrectly and must be fixed. It should be appreciated that other types of differences can be detected by the OCR analysis engine 106b (e.g., font size, text layout, text formatting).

Upon detecting a difference between the respective sets of text segments, the OCR analysis engine 106b can transmit a notification to, e.g., a quality assurance test device that describes the error for resolution by the QA team. In some embodiments, a log file is generated during the testing phase which compiles the differences or errors detected by the system 100 for later review.

Also, it should be understood that as the client computing device 101 is performing commands to interact with various aspects of the mobile application (e.g., entering text, clicking user interface elements, navigating to other pages) and the device 101 is capturing corresponding screenshots, the system 100 is capable of automatically synchronizing the mobile application on each of the mobile devices 102a-102c to perform the same commands so that the mobile devices 102a-102c reflect the same application state and capture screenshots at the same points so that the OCR analysis engine 106b can automatically analyze the screenshots in real-time to identify differences and errors. In this way, the client computing device 101 can perform an entire test script or test scenario in a single session and the system 100 captures any differences that occur at any point during the testing session.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for automatic validation of applications on synchronized mobile devices, the method comprising:
   receiving, by a server computing device, a command associated with a mobile application accessed by a client computing device and a first image file corresponding to a current view of the mobile application on the client computing device;
   transmitting, by the server computing device, the command to a plurality of mobile computing devices coupled to the server computing device, wherein each mobile computing device accesses the mobile application and performs the command against the mobile application upon receiving the command from the server computing device;
   receiving, by the server computing device, a second image file from each mobile computing device that corresponds to a current view of the mobile application on the mobile computing device;
   generating, by the server computing device, a configuration file comprising image coordinates that define one or more areas of a current view of the mobile application, each area corresponding to an area ID, a device type of a mobile computing device, and a browser size of the mobile computing device;
   extracting, by the server computing device, a first set of text segments from one or more predefined areas of the first image file;
   extracting, by the server computing device for each second image file, a second set of text segments from one or more areas of the second image file using at least a portion of the image coordinates from the configuration file whose device type corresponds to the device type of the mobile computing device from which the second image file is received; and
   comparing, by the server computing device, the first set of text segments and each second set of text segments to determine whether a difference exists between the first set of text segments and one or more of the second sets of text segments.

2. The method of claim 1, wherein the predefined areas of the first image file are based upon a type of browser software that the client computing device uses to access the mobile application.

3. The method of claim 1, wherein the server computing device extracts the first set of text segments and the second sets of text segments by performing optical character recognition against the first image file and the second image files.

4. The method of claim 1, wherein the mobile application is provided by an application web server and each of the client computing device and the mobile computing devices connects separately to the application web server.

5. The method of claim 1, wherein the command comprises an interaction with a user interface element.

6. The method of claim 1, wherein the command comprises an input of an address to access the mobile application.

7. The method of claim 1, wherein each mobile computing device performs the command against the mobile application substantially simultaneously upon receiving the command from the server computing device.

8. The method of claim 1, wherein the difference comprises one or more text characters in the first set of text segments missing from the second set of text segments.

9. A system for automatic validation of applications on synchronized mobile devices, the system comprising a server computing device with a memory that stores computer-executable instructions and a processor that executes the computer-executable instructions to:
  receive a command associated with a mobile application accessed by a client computing device and a first image file corresponding to a current view of the mobile application on the client computing device;
  transmit the command to a plurality of mobile computing devices coupled to the server computing device, wherein each mobile computing device accesses the mobile application and performs the command against the mobile application upon receiving the command from the server computing device;
  receive a second image file from each mobile computing device that corresponds to a current view of the mobile application on the mobile computing device;
  generate a configuration file comprising image coordinates that define one or more areas of a current view of the mobile application, each area corresponding to an area ID, a device type of a mobile computing device, and a browser size of the mobile computing device;
  extract a first set of text segments from one or more predefined areas of the first image file and second sets of text segments from one or more predefined areas of each second image file;
  extract, for each second image file, a second set of text segments from one or more areas of the second image file using at least a portion of the image coordinates from the configuration file whose device type corresponds to the device type of the mobile computing device from which the second image file is received; and
  compare the first set of text segments and each second set of text segments to determine whether a difference exists between the first set of text segments and one or more of the second sets of text segments.

10. The system of claim 9, wherein the predefined areas of the first image file are based upon a type of browser software that the client computing device uses to access the mobile application.

11. The system of claim 9, wherein the server computing device extracts the first set of text segments and the second sets of text segments by performing optical character recognition against the first image file and the second image files.

12. The system of claim 9, wherein the mobile application is provided by an application web server and each of the client computing device and the mobile computing devices connects separately to the application web server.

13. The system of claim 9, wherein the command comprises an interaction with a user interface element.

14. The system of claim 9, wherein the command comprises an input of an address to access the mobile application.

15. The system of claim 9, wherein each mobile computing device performs the command against the mobile application substantially simultaneously upon receiving the command from the server computing device.

16. The system of claim 9, wherein the difference comprises one or more text characters in the first set of text segments missing from the second set of text segments.

17. A computer program product, tangibly embodied in a non-transitory computer readable storage device, for automatic validation of applications on synchronized mobile devices, the computer program product including instructions operable to cause a server computing device to:
  receive a command associated with a mobile application accessed by a client computing device and a first image file corresponding to a current view of the mobile application on the client computing device;
  transmit the command to a plurality of mobile computing devices coupled to the server computing device, wherein each mobile computing device accesses the mobile application and performs the command against the mobile application upon receiving the command from the server computing device;
  receive a second image file from each mobile computing device that corresponds to a current view of the mobile application on the mobile computing device;
  generate a configuration file comprising image coordinates that define one or more areas of a current view of the mobile application, each area corresponding to an area ID, a device type of a mobile computing device, and a browser size of the mobile computing device;
  extract a first set of text segments from one or more predefined areas of the first image file and second sets of text segments from one or more predefined areas of each second image file;
  extract, for each second image file, a second set of text segments from one or more areas of the second image file using at least a portion of the image coordinates from the configuration file whose device type corresponds to the device type of the mobile computing device from which the second image file is received; and
  compare the first set of text segments and each second set of text segments to determine whether a difference exists between the first set of text segments and one or more of the second sets of text segments.

* * * * *